United States Patent [19]

Seidenberger

[11] 4,105,576

[45] Aug. 8, 1978

[54] SPILL CONTROL COMPOSITION AND USE THEREOF

[75] Inventor: James W. Seidenberger, Bethlehem, Pa.

[73] Assignee: J. T. Baker Chemical Company, Phillipsburg, N.J.

[21] Appl. No.: 765,798

[22] Filed: Feb. 4, 1977

[51] Int. Cl.² ............................................. C09K 3/00
[52] U.S. Cl. ................................... 252/190; 252/189
[58] Field of Search ................... 252/189, 190, 259.5, 252/88, 443, 426, 449; 34/DIG. 1

[56] References Cited

U.S. PATENT DOCUMENTS

| | | | |
|---|---|---|---|
| 475,588 | 5/1892 | Mauro | 252/259.5 |
| 2,073,398 | 3/1937 | Chesny | 252/189 |
| 3,963,637 | 6/1976 | Chappell | 252/192 |
| 3,994,821 | 11/1976 | Seidenberger | 252/192 |

*Primary Examiner*—Benjamin R. Padgett
*Assistant Examiner*—Josephine L. Barr
*Attorney, Agent, or Firm*—George W. Rauchfuss, Jr.; Eugene O. Retter

[57] ABSTRACT

A spill of liquid caustic is controlled and cleaned up by being neutralized and absorbed into a novel granular composition formed from citric acid, expanded perlite, flour, fumed silica, a pH indicator dye and water.

6 Claims, No Drawings

SPILL CONTROL COMPOSITION AND USE THEREOF

FIELD OF THE INVENTION

The present invention relates to a composition for controlling and cleaning up spilled liquid caustics.

BACKGROUND OF THE INVENTION

The properties of caustics for alkalies are such that these materials attack animal matter and dissolve the epidermis of the skin. Caustic substances also evolve irritating fumes and can cause severe and painful burns to exposed skin and eyes. There is, therefore, a need for a composition of matter for controlling and cleaning up spilled liquid alkalies. Prior to this invention a formulation for control of caustic spills has been marketed by J. T. Baker Chemical Company. Said formulation was a two composition formulation that involved two steps in the neutralization-absorbtion process. That is, the formulation comprised a first component consisting of a mixture of granular citric acid monohydrate and powdered bromothymol blue, sodium salt and a second, separate component consisting of calcined atapulgite clay. Said two component formulation, although useful, was both cumbersome and inconvenient to use in many cases due simply to its two component nature. Thus, a single formulation useful as a caustic spill control formulation is both needed and desirable and additionally, such a single formulation that permits control of spilled liquid caustics at a relatively safe rate and at a cost that is not prohibitively expensive would be most desirable.

SUMMARY OF THE INVENTION

It has now been found that a granular composition formed of citric acid, expanded perlite, flour, fumed silica, a pH indicator dye and water is especially useful for the control and cleanup of spilled liquid alkalies.

DETAILED DESCRIPTION OF THE INVENTION

The granular composition useful for the purpose of this invention is an essentially homogeneous composition composed of about 51.0 to about 81.0% by weight citric acid, about 12.0 to about 21.0% by weight expanded perlite, about 12.0 to about 21.0% weight flour, about 1.2 to about 2.1% by weight fumed silcia, about 0.01 to about 0.05% by weight of a pH indicator dye and about 1.0 to about 3.0% by weight water.

The citric acid is generally employed in the form of granular citric acid monohydrate. Among the numerous types of flour tested and found useful there may be mentioned, for example, the following flours: wheat, gluten, rye, barley, oat, arrowroot, and tapioca.

An especially preferred composition of the invention may be defined as comprising the essentially homogeneous composition resulting from combining about 63.9% citric acid monohydrate, about 16.5% expanded perlite, about 16.0% wheat flour, about 1.6% fumed silica, about 0.27% normally solid pH indicator, especially bromothymol blue, sodium salt, and about 1.9% water, wherein the percentages are expressed as parts by weight.

A suitable pH indicator for use in the composition of this invention is any suitable normally solid pH indicator evidencing a prceptible color change in te range of pH from about 6.0 to 8.0. Especially preferred is a solid pH indicator evidencing a perceptible color change in the range of pH about 7.0. Especially preferred as the pH indicator is bromothymol blue sodium salt evidencing such color change in the pH range of 6.0 to 7.6. As examples of other suitable solid pH indicators useful in the powdered compositions of this invention there may be mentioned phenol red, m-nitrophenol, p-nitrophenol, bromophenol red, neutral red, bromothymol blue, and the like. Bromothymol blue is especially preferred because of its color change in the range 6.0 to 7.6 and also because its color change from yellow to blue is more easily perceptible than the color change from yellow to green especially in males with color blindness. The pH indicator is normally solid, that is, is a solid at room temperature.

It is especially important for the safety and smoothness of operation that the novel composition of this invention be an essentially homogeneous composition. In order to obtain such an essentially homogeneous composition the composition is formed by a wet coating of the perlite. That is, a composition suitable for use in this invention is prepared in the following manner. The pH indicator is added to deionized water and agitated until dissolved. A blender is charged with the citric acid monohydrate through a crusher to break up any lump and then said blender is charged with the perlite. The pH indicator solution is then poured substantially evenly over the surface of the perlite in the blender and the comonent mixed for about twenty minutes or until the mixture forms colored agglomerates of partially dissolved citric acid crystals adhering to the perlite particles. Thereafter, the flour is added to the mixture and blended for a time sufficient for the flour to coat and partially dry the formulation, generally for about fifteen minutes. The blender then has added to the formulation the fumed silica, generally Cab-O-Sil M5, which is then blended to coat the agglomerates, increase the product bulk density, generally to about 0.51 to 0.57 g/cc and form a free-flowing granular product. The time of this blending step is somewhat critical in that it is long enough to provide a homogeneous blend but brief enough to avoid excessive mechanical abrasion which would break the agglomerates destroying the non-classifying property of the composition; generally about fifteen to twenty minutes of blending results in an acceptable product.

The two-cmponent prior art caustic spill control compostition mentioned hereinbefore is not amenable to formulation into a single component formulation due to the classifying nature of the components, that is, the citric acid and the calcined atapulgite clay separate on standing or slight shaking rendering the formulation unsuitable for use as an effective and efficient caustic spill control composition. With the novel composition of this invention, such a problem of classification in the product formulation is substantially eliminated.

As examples of alkalies that may have spills thereof controlled and cleaned up by the granular compositions of this invention there may be mentioned, for example, sodium hydroxide, potassium hydroxide and ammonium hydroxide.

Following a liquid caustic spill a granular composition of this invention, such as the preferred composition described hereinbefore, may be employed to control and clean up substantialy all the spilled caustic by applying the granular composition to the spill surface, preferably from the perimeter inward, in a quantity sufficient to neutralize and absorb all the spilled caustic. On initial contact with the spilled caustic the spill control composition containing bromothymol blue, sodium salt indicator, changes from yellow to blue indicating a caustic condition. The neutralization is intitiated and proceeds rapidly upon contact of the caustic with the composition. The spilled caustic is absorbed into the granular composition. Return to a yellow or yellow/green color signals a neutralized waste material. The yellowish waste material at this point exhibits a soft dough-like consistency. Observation of the color change of indicator in the slurry will indicate when the slurry has reached an essentiaily safe pH condition for further handling. After reaching the essentially safe condition the waste material can be scraped off the spill surface by use of any suitable scoop, preferably plastic, andplaced into any suitable waste disposal container, for example, a plastic disposal bag, and disposed of in accordance with any applicable environmental disposal regulations.

From the foregoing it will be seen that a composition and method have been provided which will eliminate quickly and easily the hazard to persons working under conditions susceptible to spillage of caustics.

It will be understood that the embodiments discussed herein and the use for the embodiments merely illustrative of my invention and that one skilled in the art can make suitable modifications thereof without departing from the spirit and intent of the invention.

What is claimed is:

1. An essentially homogeneous graular composition useful for the control and cleanup of liquid caustic spills comprising: from about 51.0 to about 81.0% by weight citric acid, about 12.0 to about 21.0% by weight expanded perlite, about 12.0 to about 12.0% by weight flour, about 1.2 to about 2.1% by weight fumed silica, about 0.01 to about 0.50% by weight of a pH indicator changing color in the range of about pH 6.0 to 8.0 and about 1.0 to about 3.0% by weight water and wherein the flour is selected from the group consisting of wheat, gluten, rye, barley, oat, arrowroot and tapioca flour.

2. The composition of claim 1 comprising about 63.9% by weight citric acid monohydrate, about 16.5% by weight expanded perlite, about 16.0% by weight wheat flour, about 1.6% by weight fumed silica, about 0.027% by weight normally solid pH indicator, and about 1.9% by weight water.

3. The composition of claim 2 wherein the pH indicator is bromothymol blue, sodium salt.

4. A method for the control and cleanup of spilled liquid caustic comprising contacting said spilled caustic with a composition of claim 1 and disposing of the resulting waste material after the change in color of the pH indicator in the material evidences that the waste material has reached an essentially safe pH condition.

5. A method for the control and cleanup of spilled liquid caustic comprising contacting said spilled caustic with a composition of claim 2 and disposing of the resulting waste material after the change in color of the pH indicator in the material evidences that the waste material has reached an essentially safe pH condition.

6. A method for the control and cleanup of spilled liquid caustic comprising contacting said spilled caustic with a composition of claim 3 and disposing of the resulting waste material after the change in color of the pH indicator in the material evidences that the waste material has reached an essentially safe pH condition.

* * * * *